United States Patent [19]

Bonds et al.

[11] 4,436,279
[45] Mar. 13, 1984

[54] STEM CONNECTION FOR GATE VALVE

[75] Inventors: James V. Bonds, Houston; Paul R. Orum, Stafford, both of Tex.

[73] Assignee: ACF Industries, Incorporated, New York, N.Y.

[21] Appl. No.: 453,568

[22] Filed: Dec. 27, 1982

[51] Int. Cl.³ .................... F16K 25/00; F16K 31/143
[52] U.S. Cl. ...................................... 251/86; 251/14; 251/63.6; 251/330
[58] Field of Search .................. 251/14, 84, 86, 63.6, 251/63.5, 196, 327, 328, 329, 330

[56] References Cited

U.S. PATENT DOCUMENTS

| | | | |
|---|---|---|---|
| 3,463,446 | 8/1969 | Natho | 251/84 |
| 3,466,001 | 9/1969 | Nelson | 251/63.6 |
| 3,913,883 | 10/1975 | Irwin | 251/63.6 |
| 3,958,592 | 5/1976 | Wells et al. | 251/63.6 |
| 4,213,480 | 7/1980 | Orum et al. | 251/14 |
| 4,376,524 | 3/1983 | Shelton | 251/86 |

Primary Examiner—George L. Walton
Attorney, Agent, or Firm—Marvin J. Marnock

[57] ABSTRACT

A reciprocating gate valve having an adjustable low stress stem connection structure (70) for connecting an operating stem (42) to a gate member (24). The connection structure includes a stem extension (78) formed on the bottom end of the operating stem (42) threadably receiving a collar (84) having an axial bore (86) coaxial with the stem (42) and extending therethrough receiving a gate extension (72) formed on the top end of the gate member (24). The collar (84) has a slot (96) extending generally perpendicular to the axial bore (86) in the direction of fluid flow through the valve. An adjusting nut (106) fits into the slot (96) and threadably engages the gate extension (72). The slot (96) permits movement of the nut (106) and gate member (24) relative to the longitudinal axis of the tem (42) in a direction generally parallel to the direction of fluid flow through to the gate valve. The nut (106) is accessible from the slot (96) for manual axial adjustment of the gate member (24) relative to the stem (42) so that the gate member port (30) can be aligned with the flow passages. The stem extension (78) has an annular shoulder (116) to provide a metal-to-metal seal with the bonnet (36) in the closed position of the gate valve.

7 Claims, 7 Drawing Figures

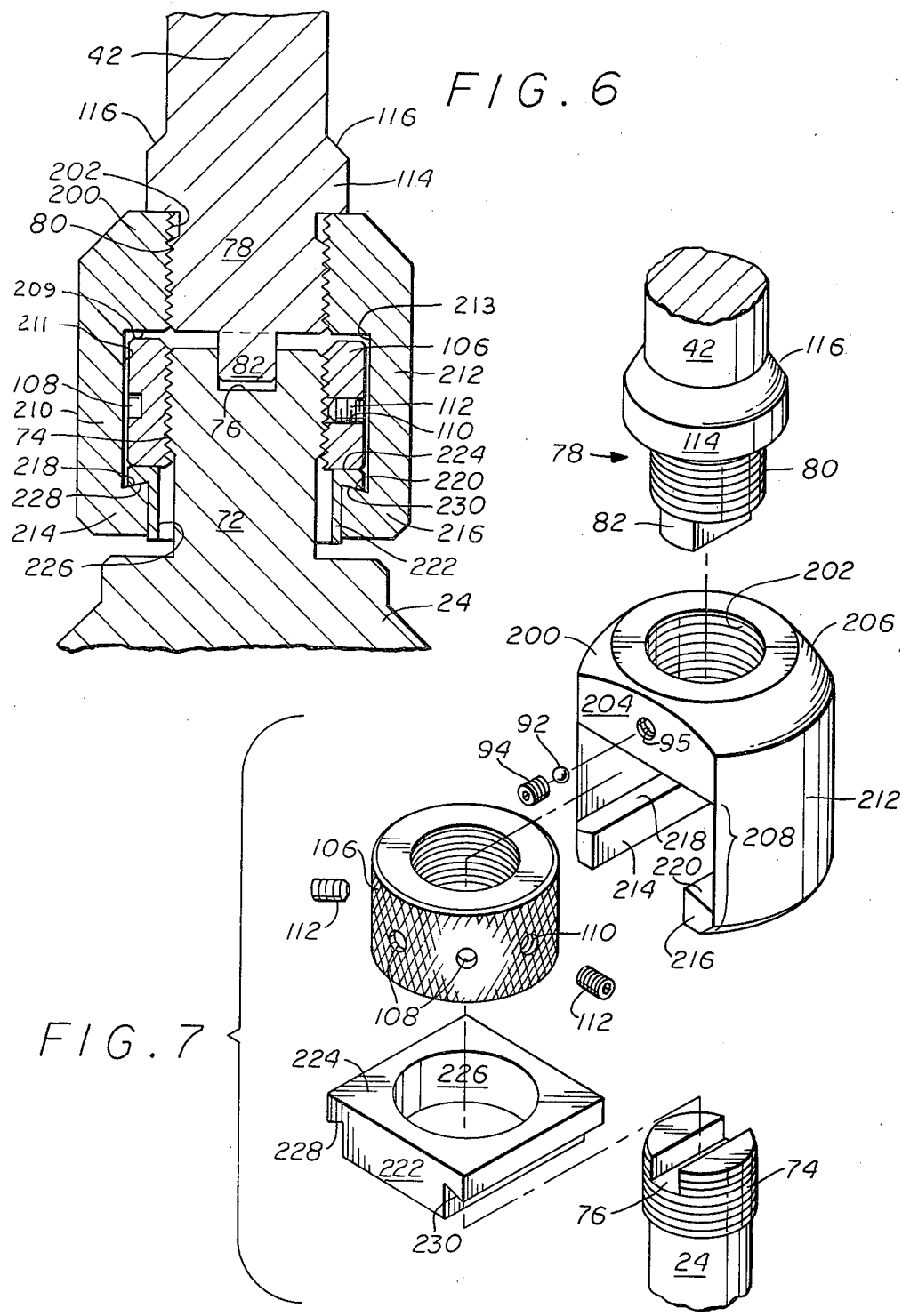

STEM CONNECTION FOR GATE VALVE

BACKGROUND OF THE INVENTION

This invention relates generally to reciprocating gate valves which move longitudinally between open and closed positions and, specifically, to such a gate valve having an adjustable low stress stem connection structure for connecting an operating stem to the gate member.

In recent years, the pipeline industry and the petroleum production industry have constructed pipelines and other fluid flow handling structures having high operating pressures (e.g. 5,000 psi and above) and increased fluid flow velocities. The need has arisen for the construction of gate valves that can withstand these higher operating pressures and increased fluid flow velocities. It has been determined that under these conditions the valves must be able to withstand greater thrust and torque forces and frequently the metal valve parts are under extreme stress. In valves used in the petroleum industry there exists a phenomenon known as "stress corrosion" which causes a breakdown of stressed metal valve parts when the valve is subjected to certain service conditions such as a hydrogen sulfide environment. It is known that the corrosive reaction is accelerated if the valve parts are allowed to remain under stress for extended periods and that ultimate fracture and failure of the valve parts will likely occur. Thus, it is desirable to have a gate valve in which it is possible to minimize the stresses acting on the valve parts.

"Stress corrosion" is not a new phenomenon and stem connection structures presently exist that attempt to minimize such stresses. U.S. Pat. No. 3,463,446 to Natho shows a stem connection between an operating stem and a gate member which permits movement of the gate member relative to the stem in the direction of fluid flow through the valve. However, there is no provision for axial adjustment of the gate member relative to and independent of the operating stem to maintain the proper alignment of the gate member port with the flow passage. Stress is created in the stem connection structure due to misalignment between the gate member port and the flow passages of the valve when the gate member is in the open position. This misalignment can be caused by the stacking of manufacturing tolerances and results in the development of metal stress to a considerable magnitude in the valve parts. Misalignment also creates a backlash effect causing the gate member to "chatter" or bounce when increased fluid flow velocities are present thereby decreasing the service life of the valve.

Further, it is desirable to provide in the closed position of the gate member a metal-to-metal seal between the operating stem and the valve bonnet. Such a metal-to-metal seal inward of the stem packing relative to the flow passage of the valve protects the stem packing from exposure to high fluid pressures in the valve chamber. In Natho, due to the construction of the stem connection structure, such a metal-to-metal seal is not readily feasible. However, U.S. Pat. No. 4,213,480 to Orum et al. shows such a metal-to-metal seal between the operating stem and the valve bonnet, but no means located below the stem is disclosed to permit either longitudinal movement between the gate member and operating stem in a direction parallel to the flow passage through the valve, or axial adjustment of the gate member relative to the axis of the operating stem to maintain the proper alignment of the gate member port with the flow passage through the valve.

SUMMARY OF THE INVENTION

It is a primary object of the invention to provide an improved stem connection structure in a reciprocating gate valve which permits longitudinal movement between the gate member relative to the operating stem in a direction parallel to the flow passage through the valve, and axial adjustment of the gate member relative to the longitudinal axis of the operating stem so as to prevent the development of excessive stress between the metal parts of the gate valve, thereby eliminating or reducing stress corrosion of such parts.

Another object of the present invention is to provide in the closed position of the gate member a metal-to-metal seal between the operating stem and the valve bonnet for protection of the stem packing from exposure to high fluid pressures in the valve chamber, and to allow the packings to be replaced with the valve still in service.

A further object of the present invention is to provide a stem connection structure that eliminates excessive backlash movements between the gate member extension and the valve stem thereby increasing the service life of the valve parts.

The present invention is an improved low stress stem connection structure for connecting an operable stem and a gate member of a reciprocating gate valve which will allow manual axial adjustment of the gate member relative to the stem so that the gate member port may be correctly aligned with the flow passages and valve seat seals when the gate member is in the open and closed positions, respectively. Accordingly, the valve stem has an externally threaded end section and the gate member has an externally threaded end section adjacent and in axial alignment with the stem extension. An internally threaded collar is threaded onto the stem extension and has an axial bore therethrough relative to the axis of the stem and receives the gate extension. The collar has a slot extending therethrough in the direction of fluid flow through the valve. An adjusting nut fitting within the slot is threaded onto the gate extension thereby providing a connection between the stem and gate member.

The adjusting nut is accessible from the slot without disassembly of the stem and gate member for manual axial adjustment of the gate member relative to the stem to eliminate stresses which would otherwise be developed by misalignment between the gate member port and the flow passages. The slot permits movement of the nut and gate member relative to the longitudinal axis of the stem in the direction of fluid flow through the gate valve to further eliminate stresses to the metal valve parts. An interengaging key-slot arrangement between the stem extension and adjacent gate extension is provided which further permits movement of the gate member relative to the stem in the direction of fluid flow. The key-slot arrangement is also operative to prevent rotation of the valve stem within the bonnet of the valve.

The stem also has an enlarged diameter portion formed immediately adjacent the threaded stem extension end. The enlarged diameter portion has a frustoconical surface for mating with a corresponding surface on the bonnet assembly and providing a metal-to-metal seal between the valve chamber and bonnet when the gate member is in the closed position. The stem connection structure disclosed herein allows the metal-to-metal seal to be formed integrally with the stem providing a gate valve that can withstand the high operating pressures required in today's market.

BRIEF DESCRIPTION OF THE DRAWING

In the accompanying drawings which form part of the specification and are to be read in conjunction therewith:

FIG. 6 is a sectional view of a modified form of the invention; and

FIG. 7 is an exploded perspective view of the modified embodiment.

DETAILED DESCRIPTION OF THE INVENTION

Figure 1:
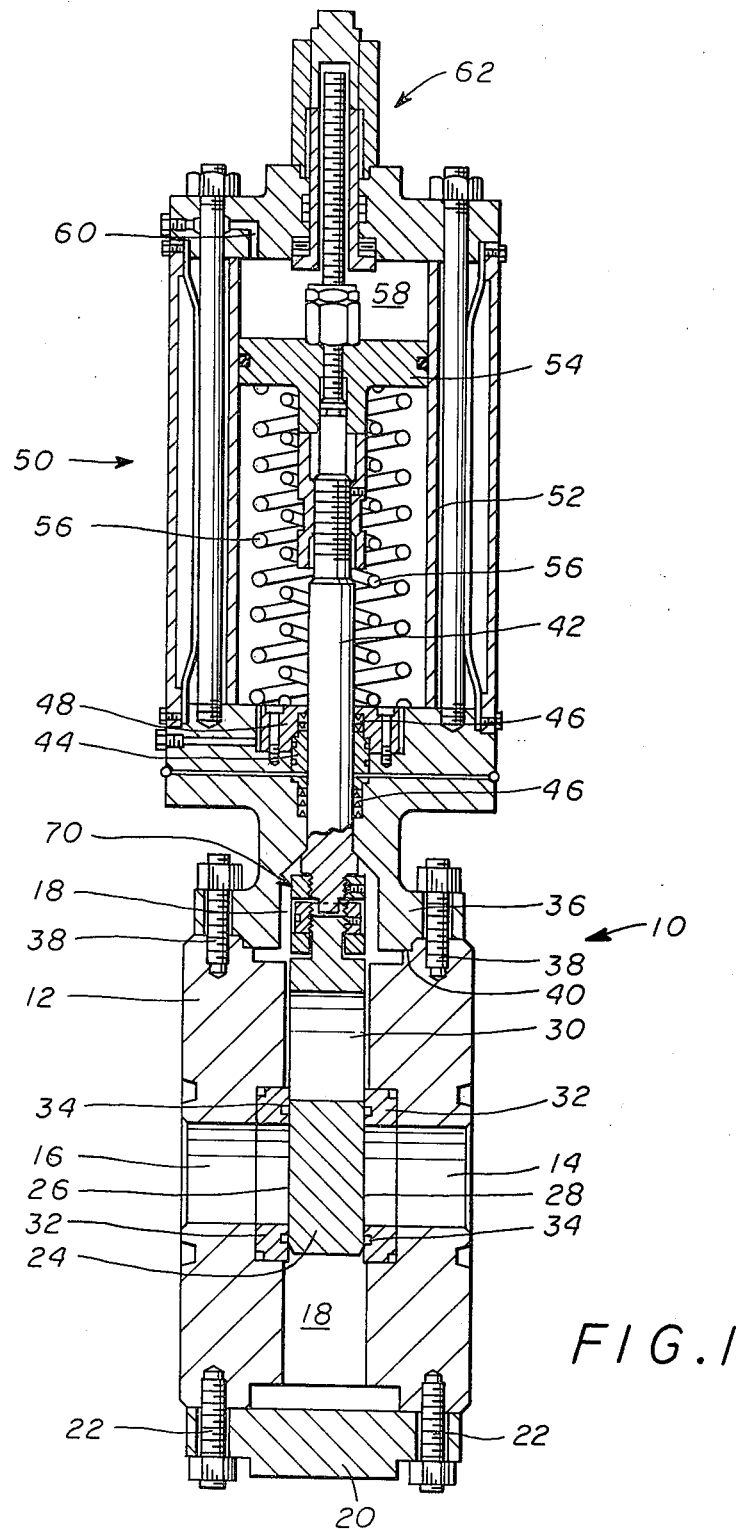
FIG. 1 is a sectional view of a high pressure gate valve constructed according to a preferred embodiment of the present invention having a fluid actuator and manual override attached thereto with the actuator shown in the relieved position and the gate member in the closed position.

Referring now to the drawings in more detail and initially to FIG. 1, numeral 10 generally designates a reciprocating gate valve constructed in accordance with a preferred embodiment of the invention. Valve 10 is intended primarily for use in high pressure applications (e.g. 5,000 psi and above) and in conjunction with a fluid actuator utilizing a manual override to cycle the valve, although it is suited for use in various other environments, particularly those in which compactness is important. The valve 10 includes a valve body 12 having an inlet flow passage 14 and an outlet flow passage 16 which cooperate to present a flow passage extending through the valve body 12. A valve chamber 18 is formed between the inlet and outlet flow passages 14 and 16. A cover plate 20 is secured to the bottom of the valve body 12 by a plurality of bolts 22.

Figure 2:
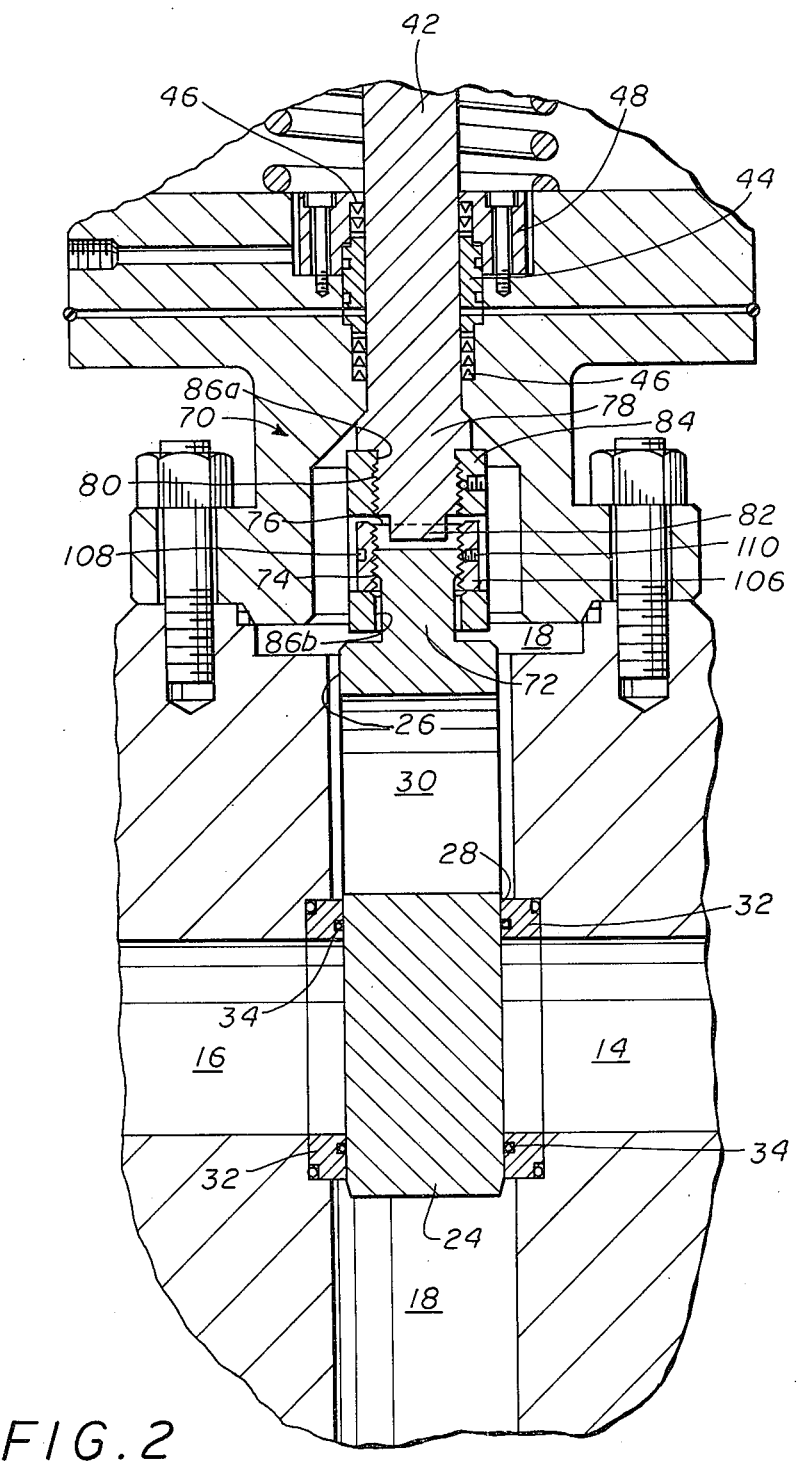
FIG. 2 is a fragmentary sectional view on an enlarged scale showing the details of the stem connection structure incorporated in the valve shown in FIG. 1, with the gate member in the closed position and the frustoconical surface of the stem extension in contact with the mating surface on the bonnet.
Figure 3:
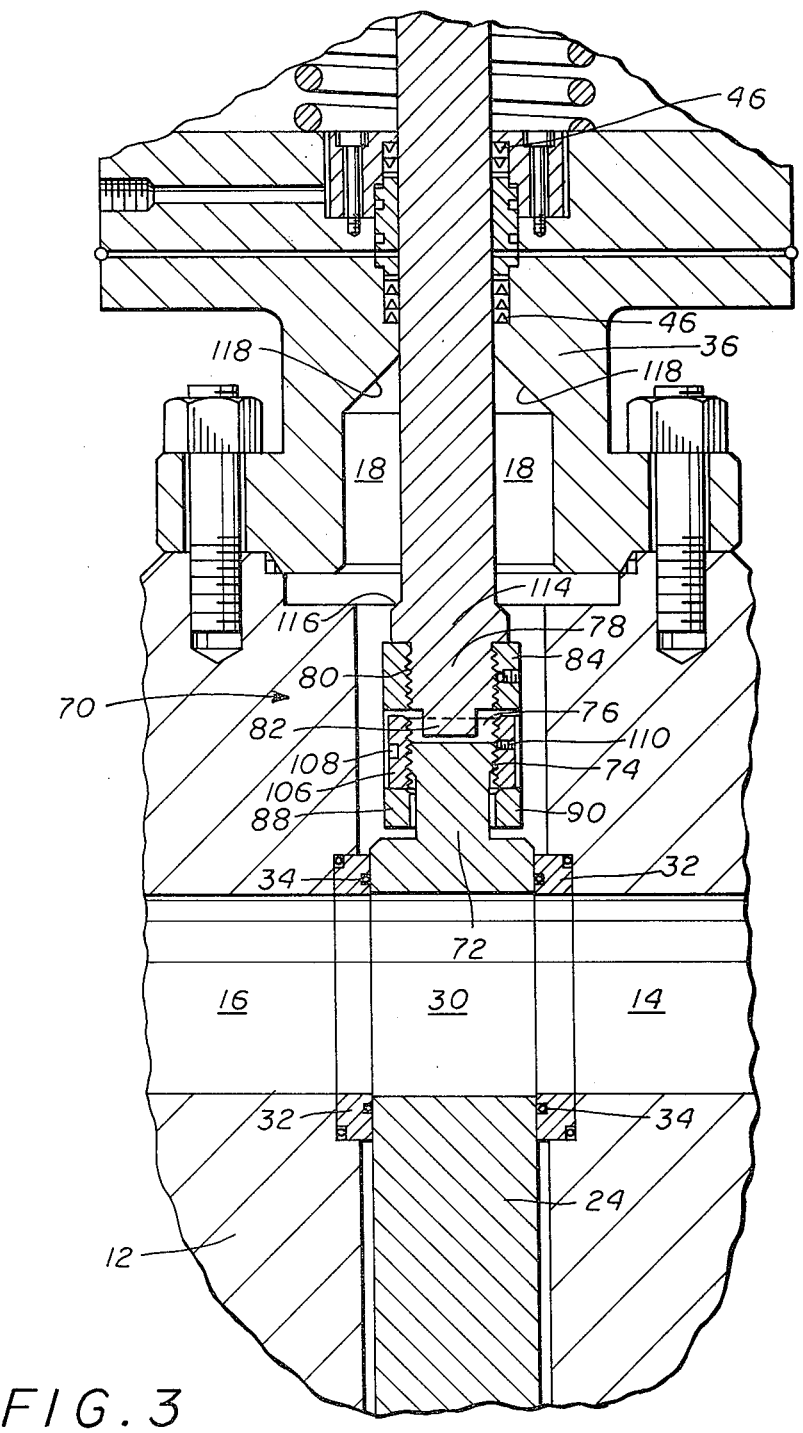
FIG. 3 is a fragmentary sectional view similar to FIG. 2 with the gate member in the open position.
Figure 4:
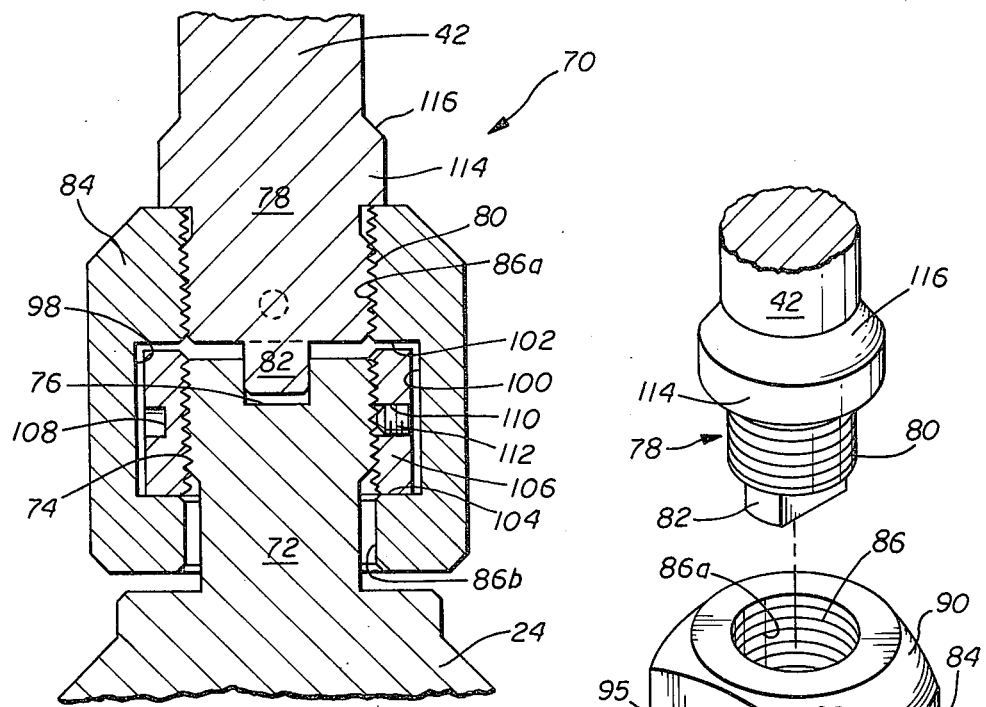
FIG. 4 is a sectional view taken generally along line 4—4 of FIG. 3.
Figure 5:
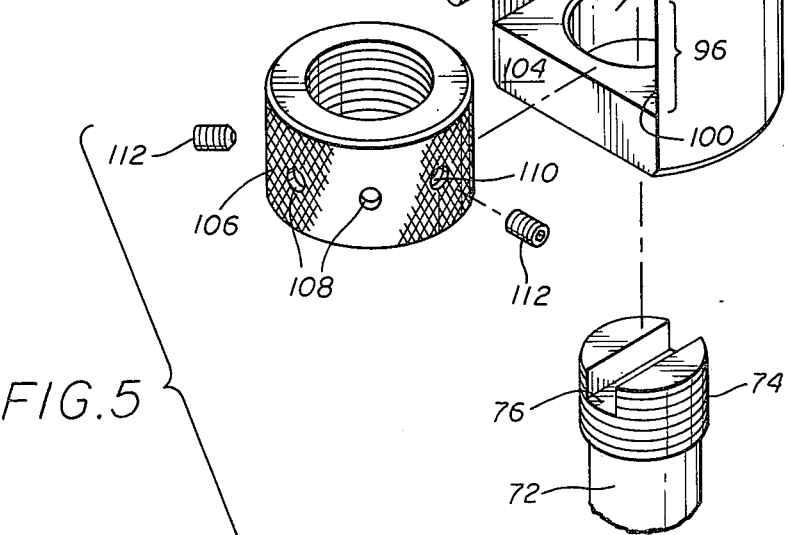
FIG. 5 is an exploded perspective view of the gate valve in FIG. 1.

A slab type gate member 24 is mounted in the valve chamber 18 for movement between an open and closed position relative to the flow passages 14 and 16. In the closed position of the gate valve shown in FIGS. 1 and 2, gate member 24 blocks the flow between passages 14 and 16. The gate member 24 has two opposed generally parallel planar surfaces 26 and 28 and a port 30 which extends between the planar surfaces 26 and 28. The port 30 aligns with the passages 14 and 16 when the gate member 24 is moved downwardly to its open position wherein fluid is able to pass through the flow passages 14 and 16 as shown in FIG. 3. A pair of annular valve seats 32 are mounted in seat pockets formed adjacent the valve chamber 18 to provide seats for gate member 24. The seats 32 have annular seals 34 therein providing a seal between the opposed planar surfaces 26 and 28 of the gate member 24 and the valve body 12 so that fluid from the flow passages 14 and 16 does not escape into the valve chamber 18.

A bonnet assembly 36 is secured to the top of the valve body 12 by a plurality of screws 38. A seal ring 40 provides a seal between body 12 and bonnet 36. The bonnet 36 has a central bore therethrough which receives an elongate valve stem 42. A packing structure 44 is disposed between stem 42 and the central bore through bonnet 36. The packing structure includes a plurality of packing rings 46 which are held in place by a retainer ring 48 secured to the bonnet 36. The packing structure 44 is designed to prevent leakage of fluid from the flow passages 14 and 16 or valve chamber 18 from communicating through the central bore of the bonnet 36 to the upper areas of the valve assembly.

Valve stem 42 extends upwardly into a cylinder 52 of the hydraulic actuator 50 which normally controls the operation of the gate member 24. Generally, the valve stem 42 is connected to a piston 54 which is contained in the cylinder 52. The cylinder 52 contains springs 56 which act upwardly on the piston 54 to bias the piston upwardly toward the position shown in FIGS. 1 and 2, wherein the gate member 24 is in its closed position. A pressure chamber 58 is formed within the top portion of cylinder 52 above piston 54 to receive hydraulic fluid under pressure through a passage 60. The hydraulic fluid is supplied by a suitable external source. If the fluid pressure in chamber 58 is sufficiently high, it overcomes the force of springs 64 and forces piston 54 downwardly until gate member 24 is in its open position as shown in FIG. 3. A manual override mechanism 62 is also provided to permit manual opening and closing of the gate member 24 in case of malfunction of the actuator 50. The specific internal workings of the hydraulic actuator 50 and manual override mechanism 62 are the subject of and are more fully described and explained in U.S. Pat. No. 4,213,480 to Orum et al.

In accordance with the present invention, an adjustable low stress stem connection structure, indicated generally at 70, is provided for connecting the valve stem 42 to the gate member 24. Referring particularly to FIGS. 2–5, the gate member 24 has an integral extension 72 at its upper end which is externally threaded as indicated at 74. In addition, gate member extension 72 is provided with an integral elongated slot 76, formed in its uppermost end, which is disposed in generally parallel relationship with the longitudinal axis of the port 30. The stem 42 also has an integral extension 78 at the lower extremity thereof extending below the bonnet 36 into the valve chamber 18. The stem extension 78 is externally threaded at its lower end as indicated at 80. In addition, an elongated key 82 is formed on the lowermost portion of the stem extension 78 and is disposed within the elongated slot 76 of the gate member extension 72 to provide a key-slot arrangement which allows the gate member 24 to shift relative to the stem 42 in a direction generally parallel with the axis of the port 30 in response to any condition producing a force or stress in a direction generally axially of the port 30. The key-slot arrangement also effectively cooperates to prevent rotation of the stem 42 relative to the gate member 24 in response to rotation of the manual override mechanism 62 which can be operated to open and close the gate member in emergency situations.

The stem connection structure further includes a generally cylindrical collar 84 provided with a bore 86 extending therethrough in axial alignment with the longitudinal axis of the stem 42. The bore 86 has an internally threaded upper portion 86a which is threadably received on the externally threaded section 80 of the stem extension 78 and a lower bore portion 86b to receive the gate member extension 72. The collar 86 has two opposed substantially parallel external planar surfaces 88 and 90 extending in a direction generally parallel to the adjacent planar surfaces 26 and 28 of the gate member 24 such that the spacing between the external surfaces 88 and 90 is slightly less than the spacing between the gate member surfaces 26 and 28 so that the collar 86 will slide into the valve body 12 when the gate member 24 is moving to its open position. A pinch ball 92 and lock screw 94 are carried in a bore 95 located on the external surface 88 of the collar 84 which communicates with the internally threaded upper bore portion 86a. After the collar 84 has been threaded onto the stem extension 78 to a predetermined position, the lock screw 94 is manipulated to positively lock the collar 84 against relative rotation with respect to the stem extension 78.

The collar 84 is further provided with a slot 96 extending between the external planar surfaces 88 and 90 and intersecting the axial bore 86. The collar 84 is positioned on the stem 42 relative to the gate member 24 so that the slot 96 extends in a direction generally parallel with the longitudinal axis of the port 30. The slot 96 has two internal substantially parallel planar surfaces 98 and 100 extending in a direction generally perpendicular to the external planar surfaces 88 and 90. The slot also has internal upper and lower surfaces 102 and 104, respectively, which are intersected by axial bore 86 thereby separating the upper bore portion 86a from the lower bore portion 86b.

An adjusting nut 106 fits into the collar slot 96 and has an external diameter slightly less than the spacing between the internal planar surfaces 98 and 100 and greater than the diameter of the lower bore portion 86b such that the lower slot surface 104 supports the nut 106. The adjusting nut 106 is threadably received onto the threaded portion 74 of the gate extension 72 which is received through the lower bore portion 86b of the collar 84 to provide a connection between the stem 42 and gate member 24 and to retain in engaging relation the key-slot arrangement of the stem and gate extensions 78 and 72. The diameter of the lower bore portion 86b is larger than the diameter of the gate extension 72, thereby allowing the gate member 24 and nut 106 to move laterally in any direction relative to the collar 86 and stem 42. This feature along with the key-slot arrangement of the stem and gate extensions 78 and 72 allow the gate member 24 to shift relative to the stem 42 in a direction generally parallel with the longitudinal axis of the port 30 in response to any condition producing a force or stress in a direction generally axially of the port 30, thereby eliminating or reducing the development of stress in any of the valve parts.

The adjusting nut 106 is provided on its external surface with blind bores 108 spaced circumferentially about the nut. The blind bores 108 are for the purpose of accommodating a suitable gripping tool for turning the adjusting nut 106 and accomplishing its threaded connection with the gate member extension 72. The adjusting nut 106 is accessible via the collar slot 96 for rotation without disassembly of the stem 42 and gate member 24 for manual axial adjustment of the gate member 24 relative to the longitudinal axis of the stem 42. This axial adjustment allows the gate member port 30 to be properly aligned with the bores of the inlet and outlet flow passages 14 and 16 when the gate member 24 is in the open position, thus, eliminating the development of shear stresses in any of the valve parts which might otherwise be developed by a mismatch between the bore walls of the port and flow passages due to minute inaccuracies in machining or the adverse effects of tolerances. Axial adjustment of the port 30 may also be necessary when the gate is in the closed position to insure that port 30 is above the valve seat seals 34 to block communication between the inlet and outlet flow passages 14 and 16.

Several of the blind bores 108 extend completely through the nut 106 and are internally threaded as indicated at 110. Once the gate member 24 has been properly aligned with respect to the flow passages 14 and 16 and the valve seat seals 34, set screws 112 are received through the threaded bores 110 firmly securing the nut 106 to the gate member extension 72 to prevent further rotation of the adjusting nut 106 relative to the gate member 24.

An important aspect of the stem connection structure which increases the service life of the valve is the provision of a structure which minimizes "chatter" or bounce of the gate member 24 created by high velocity fluid flow traveling through the valve. When fluids pass through a valve at high velocities the gate member tends to "chatter" up and down if excess free play exists in the stem connection structure. A certain amount of free play is necessary to allow lateral movement of the gate member 24 relative to the stem 42 to decrease the development of stress in the valve parts. In the present invention, the adjusting nut 106 fits between the upper and lower slot surfaces 102 and 104, respectively, of the collar 84 such that a minimal predetermined clearance exists between the nut 106 and collar 84. This clearance is sufficient to allow the lateral movement of the nut 106 and attached gate member 24 relative to the stem 42. The importance of this clearance is that it remains the same even though the nut 106 is rotated to realign the gate member port 30 relative to the flow passages or valve seat seals. Therefore, the clearance can be kept to a minimum without the additional effects of machining inaccuracies or the build up of tolerances between the stem and gate member.

Another important aspect of the present invention which improves the sealing characteristics of the valve is the provision of a stem connection structure which provides for a valve stem 42 with an integral back seat portion. The back seat portion forms a metal-to-metal seal with the bonnet when the gate member is in the closed position to protect the upper bonnet area from the high pressurized fluid existing in the flow passages. The stem extension 78 has a generally cylindrical enlarged diameter portion 114 located adjacently above the externally threaded portion 80. The enlarged diameter portion 114 has a larger diameter than the diameter of the central bore through the bonnet 36 and has an upwardly and outwardly facing frusto-conical surface 116 relative to the longitudinal axis of the stem 42. The bonnet 36 has a mating frusto-conical surface 118 to provide a metal-to-metal seal between the bonnet 36 and the valve chamber 18 when the gate member 24 is in the closed position. The metal-to-metal seal protects the packing structure 44 from high pressures existing in the flow passage or valve chamber, and also protects the integrity of the valve during external fire situations which can create excessively high pressures in the valve chamber 18. Further, when the gate member 24 is in the closed position, the metal-to-metal seal allows the valve packing structure 44 to be inspected and/or repaired with the valve remaining in service, thereby representing a savings in maintenance costs.

With reference to FIGS. 6 and 7, a modified embodiment of the collar arrangement of the stem connection structure is illustrated and generally designated by the reference character 200. Many components of the structure are identical to those previously described in FIGS. 1–5 and will be designated by the same reference characters.

A modified generally cylindrical collar 200 is provided for connecting the valve stem 42 to the gate member 24. The collar 200 has an internally threaded bore 202 extending therethrough in axial alignment with the longitudinal axis of the stem 42 which is threadably received on the externally threaded section 80 of the stem extension 78. The collar 200 has two opposed substantially parallel external surfaces 204 and 206 extending in a direction generally parallel to the adjacent planar surfaces 26 and 28 of the gate member 24 in a similar fashion to the surfaces 88 and 90 of the preferred embodiment. The collar 200 is secured to the stem extension 78 by use of a pinch ball 92 and lock screw 94 threadably received through a bore 95 in the collar 200 and contacting the threaded portion 80 of the stem extension 78 so that upon manipulation of the lock screw 94 the collar 200 is positively secured against relative rotation with respect to the stem 42.

The collar 200 is further provided with a slot 208 extending between the external planar surfaces 204 and 206 and intersecting the axial bore 202. The slot 208 is defined by an upper planar surface 209 intersected by the axial bore 202 and two depending arms 210 and 212 having opposed substantially parallel inner surfaces 211 and 213. The depending arms 210 and 212 each have an inwardly extending lip 214 and 216, respectively, on its lowermost end. The lips 214 and 216 define upwardly and outwardly facing shoulders 218 and 220 extending in a direction generally parallel to the slot 208 and the longitudinal axis of the port 30 of the gate member 24. It is important that the shoulders 218 and 220 face outwardly away from each other so that upon application of a downward force on the shoulders 218 and 220 the depending arms 210 and 212 are pulled slightly together.

A bearing member 222 is provided with a bore 226 extending therethrough and is received on the gate member extension 72. The adjusting nut 106 is threadably received on the gate member extension 72 securing the bearing member 222 in position. The bearing member 222 has an upper planar surface 224 for supporting the nut 106. The bearing member 222 further has two downwardly and inwardly facing shoulders 228 and 230 extending in a direction generally parallel to the slot 208 and the longitudinal axis of the port 30 of the gate member 24. The shoulders 228 and 230 face downwardly and inwardly toward the longitudinal axis of the bore 202 such that they slidably engage the upwardly facing shoulders 218 and 220 of the collar 200. The engaging shoulders allow the gate member 24, bearing member 222 and nut 106 to shift relative to the collar 200 and stem 42 in a direction generally parallel with the longitudinal axis of the port 30 in response to any condition producing a force or stress in a direction generally axially of the port 30, thereby eliminating or reducing the development of stress in any of the valve parts.

The adjusting nut 106 provides for axial adjustment of the gate member port 30 of the gate member 24 relative to the longitudinal axis of the stem 42 to properly align the port 30 with the bores of the inlet and outflow flow passages 14 and 16 in much the same fashion as provided for in the preferred embodiment of this invention. Further, the modified embodiment disclosed herein reduces "chatter" or bounce of the gate member 24 by minimizing the clearance between the nut 106 and the collar 200 to a predetermined amount. The modified collar 200 also allows an integral back seat portion to be formed on the stem extension 78 thereby providing a metal-to-metal seal between the stem 42 and the bonnet 36 when the gate member is in the closed position which improves the overall sealing characteristics of the valve.

It will be evident from the foregoing that the present invention provides a unique adjustable low stress stem connection structure for connection between the valve stem and gate member of a valve. The novel design of the invention allows lateral shifting of the valve element in a downstream direction by the pressurized fluid controlled by the valve so that a proper sealing engagement is established between the gate member and the downstream valve seat and yet allows the connection structure to be relatively free of lateral stresses. The design further allows axial adjustment of the gate member relative to the longitudinal axis of the stem so that the proper alignment between the gate member port and flow passages is maintained thereby decreasing further the development of material stress of sufficent magnitude to cause stress corrosion. The invention effectively promotes long-life of the internal components of valves even when the same are disposed in critical service environments such as hydrogen sulfide.

The foregoing description of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. For example, although a slab type gate valve was illustrated, the invention could easily be applied to other types of valves. Also, it is not required that the valve utilize an actuator or manual override mechanism, the invention is useful in valves utilizing any actuation means. It is intended that the scope of the invention be defined by the claims appended hereto.

What is claimed is:

1. An improved stem connection structure for connecting a stem to a gate member in a reciprocating gate valve of the type having a valve body with a valve chamber and inlet and outlet flow passages communicating with the valve chamber, a gate member slidably mounted within the valve chamber for movement between open and closed positions relative to the flow passages and having an externally threaded upper gate extension thereon, the gate extension having a first slot formed therein being disposed in substantially parallel relation with the longitudinal axes of the inlet and outlet flow passages, a bonnet connected to the valve body to form a closure for the valve body, an operating stem carried by the bonnet and having a stem extension on the lower end thereof disposed within the valve chamber, the stem extension having an elongated key formed on its lowermost end received by the first slot of the gate extension to form a key-slot combination, and the stem having operator means connected to an upper end thereof for moving the stem and gate member in a direction transversely to the direction of fluid flow through the flow passages, wherein the improvement comprises:

the stem extension having an externally threaded portion contained thereon adjacent and above the elongated key;

an internally threaded collar threadably engaging the stem extension and having an axial bore therethrough in axial alignment with the longitudinal axis of the stem surrounding the key-slot combination, and having a second slot extending therethrough in the direction of fluid flow through the gate valve, releasable locking means on the collar for releasably securing the collar to the stem extension at a predetermined position;

an adjusting nut fitting within the second slot and threaded onto the gate extension for providing a connection between the stem and gate member, the second slot having supporting means for retaining the nut and collar in engaging relationship and retaining the key-slot combination in engaging relationship, the second slot permitting movement of the nut and gate member relative to the longitudinal axis of the stem in a direction generally parallel to the longitudinal axis of the flow passage, the adjusting nut being accessible through the second slot without disassembly of the stem and gate member for manual axial adjustment of the gate member relative to the longitudinal axis of the stem so that the gate member port can be aligned with the inlet and outlet flow passages when the gate member is in the open position; and releasable locking means on the nut for releasably securing the nut to the gate extension at a predetermined position.

2. An improved stem connection structure for connecting a stem to a gate member in a reciprocating gate valve of the type having a valve body with a valve chamber and inlet and outlet flow passages communicating with the valve chamber, a gate member with opposed generally parallel faces slidably mounted within the valve chamber for movement between open and closed positions relative to the flow passages and having an externally threaded upper gate extension thereon, the gate extension having a first slot formed therein being disposed in substantially parallel relation with the longitudinal axes of the inlet and outlet flow passages, a bonnet connected to the valve body to form a closure for the valve body, an operating stem carried by the bonnet and having a stem extension on the lower end thereof disposed within the valve chamber, the stem extension having an elongated key formed on its lowermost end received by the first slot of the gate extension to form a key-slot combination, and the stem having operator means connected to an upper end thereof for moving the stem and gate member in a direction transversely to the direction of fluid flow through the flow passages, wherein the improvement comprises:

an enlarged diameter portion integrally formed on the stem extension having a frusto-conical surface facing outwardly away from the flow passage and longitudinal axis of the stem, the bonnet having a mating surface facing the frusto-conical surface of the enlarged diameter portion so that a metal-to-metal seal is provided between the valve chamber and bonnet when the gate member is in the closed position;

an externally threaded portion formed on the stem extension adjacent and below the enlarged diameter portion;

an internally threaded generally cylindrical collar threadably receiving the stem extension, the collar being in axial alignment with the stem and having an axial bore therethrough receiving the key-slot arrangement and being of a diameter generally the same as the diameter of the stem and gate extensions, the collar having two opposed external substantially planar surfaces extending generally parallel to the adjacent faces of the gate member but being spaced less than the spacing between the gate member faces so that the stem connection structure is received within the valve chamber of the valve body in the open position of the gate member, the collar having a second slot extending therethrough in the direction of fluid flow through the gate valve and defining two internal generally parallel planar surfaces extending in a direction generally perpendicular to the external planar surfaces, and releasable locking means on the collar for releasably securing the collar to the stem extension;

an adjusting nut fitting within the second slot and threaded onto the gate extension for providing a connection between the stem and gate member and to retain the key-slot communication of the stem and gate extensions in engaging relation, the nut having a greater external diameter than the diameter of the axial bore in the collar and less than the spacing between the internal planar surfaces, the collar having an inner support shoulder adjacent the internal planar surfaces and generally perpendicularly thereto to support the nut and attached gate member and to permit movement of the nut and gate member relative to the longitudinal axis of the stem in a direction generally parallel to the axis of the flow passage, the adjusting nut being accessible through the second slot without diassembly of the stem and gate member for manual axial adjustment of the gate member relative to the axis of the stem so that the gate member port can be aligned with the inlet and outlet flow passages when the gate member is in the open position; and releasable locking means on the nut for releasably securing the nut to the gate extension at a predetermined position.

3. A gate valve comprising:

a valve body having a valve chamber and inlet and outlet flow passages communicating with the valve chamber, and a valve seat positioned about each of the inlet and outlet flow passages;

a gate member with opposed generally parallel faces extending generally perpendicular to the flow passage with a port extending therethrough between the opposed faces and parallel to the flow passage, the gate member being slidably mounted within the valve chamber for movement of the port between open and closed positions relative to the flow passages and having an externally threaded upper gate extension thereon;

a bonnet assembly forming a closure for the valve chamber having an operating stem carried therein, the stem having an externally threaded lower stem extension adjacent and in axial alignment with the gate extension, and having operator means connected to an upper end section of the stem for moving the stem and gate member in a direction transversely to the direction of fluid flow through the flow passages;

coacting means contained on the stem and gate extensions for permitting movement of the gate member relative to the longitudinal axis of the stem in a direction generally parallel to the longitudinal axes of the flow passages through the gate valve, and for preventing relative rotational movement between the stem and gate member;

an internally threaded collar in threaded engagement with the lower stem extension with an axial bore relative to the stem therethrough, and housing the coacting means of the stem and gate extensions, the collar having a slot extending therethrough in the direction of fluid flow through the gate valve and having releasable locking means for releasably securing the collar to the stem extension at a predetermined position;

an adjusting nut fitting within the slot and threaded onto the gate extension for providing a connection between the stem and gate member, the collar supporting the nut and gate member and retaining the coacting means of the stem and gate extensions in assembled relation, the slot permitting movement of the nut and gate member relative to the longitudinal axis of the collar and stem in a direction generally parallel to the longitudinal axis of the flow passage, the adjusting nut being accessible from the slot without disassembly of the stem and gate member for manual axial adjustment of the gate member relative to the longitudinal axis of the stem so that the gate member port can be aligned with the inlet and outlet flow passages when the gate member is in the open position; and releasable locking means on the nut for releasably securing the nut to the gate extension at a predetermined position.

4. A gate valve as set forth in claim 3, wherein the coacting means comprises an engaging key-slot arrangement contained on the ends of the stem and gate extensions so that when the collar and adjusting nut are assembled the slot formed in the end of one extension extends in the direction of fluid flow through the gate valve and the key formed on the end of the other extension slidably engages the slot to permit movement of the gate member relative to the stem in the direction of fluid flow through the gate valve.

5. A gate valve as set forth in claim 4, further comprising an enlarged diameter portion formed on the stem extension immediately adjacent and above the threaded portion, the enlarged diameter portion having a frusto-conical surface facing outwardly away from the flow passages and stem axis, the bonnet assembly having a mating surface facing the frusto-conical surface so that a metal-to-metal seal is provided between the valve chamber and bonnet when the gate member is in the closed position.

6. A gate valve as set forth in claim 5, wherein the collar comprises a substantially cylindrical housing in axial alignment with the stem with an axial bore therethrough receiving the key-slot arrangement and being of a diameter generally the same as the diameter of the stem and gate extensions, the collar having two opposed external substantially parallel planar surfaces extending generally parallel to the adjacent faces of the gate member but being spaced less than the spacing between the gate member faces so that the stem connection structure is received within the valve chamber of the valve body in the open position of the gate member, the slot in the collar defining two internal generally parallel planar surfaces extending in a direction generally perpendicular to the external planar surfaces, the collar having an inner support shoulder adjacent the internal planar surfaces and generally perpendicularly thereto to support the nut and attached gate member.

7. A gate valve as set forth in claim 5, wherein the collar comprises a substantially cylindrical housing in axial alignment with the stem and having an axial bore therethrough receiving the key-slot arrangement, the slot defining an internal planar surface extending in a direction generally perpendicular to the longitudinal axis of the stem and having two opposed depending arms, the depending arms each having a bottom lip portion providing an upwardly facing shoulder on the inside of the slot, a bearing member is received on the gate extension and secured thereto by the adjusting nut, the bearing member slidably engaging the upwardly facing shoulders provided on the lip portions so that the bearing member may slide in the slot in a direction parallel with the flow passages of the gate valve and to support the nut and attached gate member.

* * * * *